US012739568B2

(12) United States Patent
Ohara

(10) Patent No.: US 12,739,568 B2
(45) Date of Patent: Sep. 15, 2026

(54) WIRE DAMPER OF LOUDSPEAKER WITH PERIODIC SPAN WIRES AND THE METHOD FOR MANUFACTURING THE SAME

(71) Applicant: Hiroko Ohara, Taoyuan (TW)

(72) Inventor: Hiroko Ohara, Taoyuan (TW)

( * ) Notice: Subject to any disclaimer, the term of this patent is extended or adjusted under 35 U.S.C. 154(b) by 207 days.

(21) Appl. No.: 18/640,081

(22) Filed: Apr. 19, 2024

(65) Prior Publication Data

US 2025/0287153 A1 Sep. 11, 2025

(30) Foreign Application Priority Data

Mar. 5, 2024 (TW) ................................ 113108004

(51) Int. Cl.
*H04R 1/28* (2006.01)
*H04R 9/04* (2006.01)
*H04R 31/00* (2006.01)

(52) U.S. Cl.
CPC ............ *H04R 9/043* (2013.01); *H04R 31/00* (2013.01)

(58) Field of Classification Search
CPC ................................ H04R 9/403; H04R 31/00
USPC ........................................ 381/409, 403, 300
See application file for complete search history.

(56) References Cited

U.S. PATENT DOCUMENTS 7,382,892 B2 * 6/2008 Chan ........................ H04R 9/06 381/403
11,317,229 B1 * 4/2022 Chen ...................... H04R 31/00
2002/0034315 A1 * 3/2002 Auerbach ................ H04R 1/06 381/409
2022/0167088 A1 * 5/2022 Zhu .......................... H04R 7/10
2023/0164505 A1 * 5/2023 Chen .................... H04R 31/006 29/594

* cited by examiner

*Primary Examiner* — William J Deane, Jr.

(57) ABSTRACT

A method for manufacturing a wire damper of a loudspeaker with periodic span wires, including: arranging warp yarns and wire assemblies at intervals, which extend straightly and are parallel to each other; interweaving weft yarns with the warp yarns and the wire assemblies to weave a base material, each wire assembly periodically spans above and below the weft yarn assemblies, and an area where the weft yarn assemblies defined by at least two adjacent weft yarns are interwoven with each wire assembly is defined as a wire disposing area; impregnating the base material in a resin solution; drying the base material; thermoforming a wire damper on the base material; separating the wire damper from the base material. Therefore, the strength of the weft yarns fixing the wire assemblies can be reduced, thereby reducing the influence of the weft yarns on the wire assemblies, imparting the wire assemblies better elasticity.

16 Claims, 11 Drawing Sheets

WIRE DAMPER OF LOUDSPEAKER WITH PERIODIC SPAN WIRES AND THE METHOD FOR MANUFACTURING THE SAME

CROSS-REFERENCE TO RELATED APPLICATION

This application claims the priority of Taiwanese patent application No. 113108004, filed on Mar. 5, 2024, which is incorporated herewith by reference.

BACKGROUND OF THE INVENTION

1. Field of the Invention

The present invention relates to a wire damper of a loudspeaker and the method for manufacturing the same, and more particularly, to a wire damper of a loudspeaker with periodic span wires and the method for manufacturing the same.

2. The Prior Arts

In the general moving coil loudspeaker, the principle that the reaction force of a fixed magnetic field causes another magnetic field to move in the opposite direction (i.e., opposite magnetism attracts each other, and like magnetism repels each other) is used to produce sound. Further, the power alternating current generated by the power amplifier is transmitted to the voice coil through a wire to change the polarity of the magnetic field, such that the voice coil generates a reaction force against the fixed magnetic region generated by the magnetic circuit device. A positive pulse causes an outward motion of the diaphragm relative to the magnet, while a negative pulse causes an inward motion of the diaphragm. When the voice coil pushes the diaphragm to reciprocate, the diaphragm pushes air, and the air pressure changes to form sound waves. The damper is responsible for maintaining the voice coil at a correct position in the gap of the magnet core, ensuring that the voice coil reciprocates along the axis direction when being forced.

A conventional wire damper of a loudspeaker comprises a main body, four wire assemblies and a resin solid layer. The main body includes a plurality of warp yarns and a plurality of weft yarns, and the weft yarns are interwoven with the warp yarns and the wire assemblies. Each wire assembly is composed of a plurality of wires. The weft yarns jointly form two elastic adjustment areas between the warp yarns closest to both sides of the wire assemblies and the wire assemblies, the widths of the elastic adjustment areas are equal to each other and greater than the distance between the warp yarns. The solid resin layer covers surfaces of the warp yarns, the weft yarns and the wires.

Because the wire assemblies are harder than the warp yarns and the weft yarns, and the elasticity and toughness of the wire assemblies are worse than those of the warp yarns and the weft yarns, in the conventional wire damper of the loudspeaker, the hardness, the elasticity and the toughness of the wire disposing areas can be jointly adjusted by disposing the elastic adjustment areas.

However, since two adjacent weft yarns pass above and below the wire assemblies respectively, although the weft yarns can firmly fix the wire assemblies through weaving, the fixing strength applied by the weft yarns is quite great, which affects the elasticity of the wire assemblies, causing the effect of jointly adjusting the hardness, the elasticity and the toughness of the wire disposing areas by the elastic adjustment areas to be less effective than expected. The wire disposing areas are still harder than the other areas of the wire damper of the loudspeaker, and the elasticity and the toughness of the wire disposing areas are still worse than those of the other areas of the wire damper of the loudspeaker. Therefore, the hardness, the elasticity and the toughness of the wire damper of the loudspeaker are not uniform, causing the elastic resilience and the fatigue resistance of the wire damper of the loudspeaker to be not uniform. Therefore, the wire damper of the loudspeaker is prone to be deformed, thereby affecting the output sound quality of the loudspeaker.

SUMMARY OF THE INVENTION

A main objective of the present invention is to provide a wire damper of a loudspeaker with periodic span wires and the method for manufacturing the same, which can reduce the strength of the weft yarns fixing the wire assemblies.

In order to achieve the above objective, the present invention provides a method for manufacturing a wire damper of a loudspeaker with periodic span wires, comprising the following steps: (a) arranging a plurality of warp yarns and a plurality of wire assemblies at intervals in a manner that the warp yarns and the wire assemblies extend straightly along a first direction and are parallel to each other, wherein each wire assembly is composed of a plurality of wires, and each wire is a monofilament thread; (b) interweaving a plurality of weft yarns with the warp yarns and the wire assemblies along a second direction to weave a base material, wherein the first direction is perpendicular to the second direction, at least two adjacent weft yarns are defined as a weft yarn assembly, each wire assembly periodically spans above and below the weft yarn assemblies along the first direction, and an area where the weft yarn assemblies are interwoven with each wire assembly is defined as a wire disposing area; (c) impregnating the base material in a resin solution; (d) drying the base material to form a solid resin layer on the base material; (e) forming a wire damper of a loudspeaker on the base material by thermoforming; and (f) separating the wire damper of the loudspeaker from the base material.

In some embodiments, in the step (a), the wires are arranged at intervals from each other.

In some embodiments, in the step (a), the wires are blend-twisted such that each wire assembly forms a multifilament thread with a circular cross-section.

In some embodiments, in the step (a), the wires are braided with each other such that each wire assembly forms a multifilament thread with a flat cross-section.

In some embodiments, in the step (e), the weft yarns jointly form a first elastic adjustment area between a first side of each wire assembly and the warp yarn closest to the first side of each wire assembly, the weft yarns jointly form a second elastic adjustment area between a second side of each wire assembly and the warp yarn closest to the second side of each wire assembly, a width of the first elastic adjustment area and a width of the second elastic adjustment area are equal to each other, a distance between the warp yarns is smaller than the width of the first elastic adjustment area and the width of the second elastic adjustment area.

In order to achieve the above objective, the present invention provides a wire damper of a loudspeaker with periodic span wires, comprising a main body, a plurality of wire assemblies and a solid resin layer. The main body includes a plurality of warp yarns and a plurality of weft yarns, the warp yarns are arranged at intervals and extend straightly along a first direction and are parallel to each other, the weft yarns are interwoven with the warp yarns along a second direction, the first direction is perpendicular to the second direction, and at least two adjacent weft yarns are defined as a weft yarn assembly. A plurality of wire assemblies are arranged at intervals with the warp yarns, extend straightly along the first direction, are parallel to the warp yarns, and cross above and below the weft yarn assemblies along the first direction periodically, wherein each wire assembly is composed of a plurality of wires, each wire is a monofilament thread, and an area where the weft yarn assemblies are interwoven with each wire assembly is defined as a wire disposing area. The solid resin layer covers surfaces of the warp yarns, the weft yarns and the wires.

In some embodiments, the wires are arranged at intervals from each other.

In some embodiments, the wires are blend-twisted such that each wire assembly forms a multifilament thread with a circular cross-section.

In some embodiments, the wires are braided with each other such that each wire assembly forms a multifilament thread with a flat cross-section.

In some embodiments, the weft yarns jointly form a first elastic adjustment area between a first side of each wire assembly and the warp yarn closest to the first side of each wire assembly, the weft yarns jointly form a second elastic adjustment area between a second side of each wire assembly and the warp yarn closest to the second side of each wire assembly, a width of the first elastic adjustment area and a width of the second elastic adjustment area are equal to each other, a distance between the warp yarns is smaller than the width of the first elastic adjustment area and the width of the second elastic adjustment area.

The effect of the present invention is in that by disposing the wire assemblies in a periodically spanning manner, the strength of the weft yarns fixing the wire assemblies can be reduced, thereby reducing the influence of the weft yarns on the wire assemblies, so as to impart the wire assemblies better elasticity.

DETAILED DESCRIPTION OF THE PREFERRED EMBODIMENT

Figure 1:
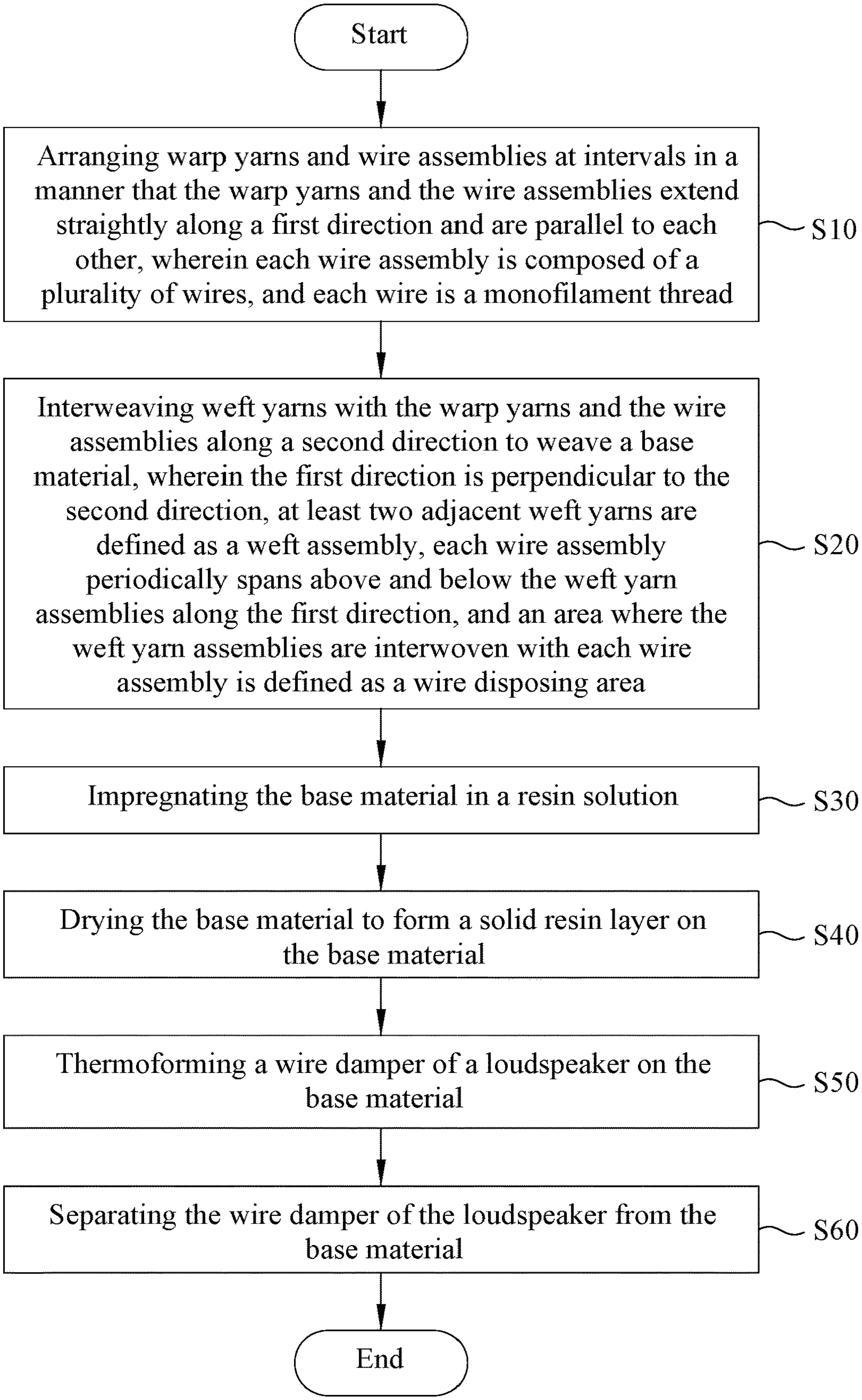
FIG. 1 is a flow diagram of a manufacturing method of the present invention.

Hereinafter, embodiments of the present invention will be described in more detail with reference to the drawings and the reference numerals, such that those skilled in the art can implement it after studying this specification.

Figure 2:
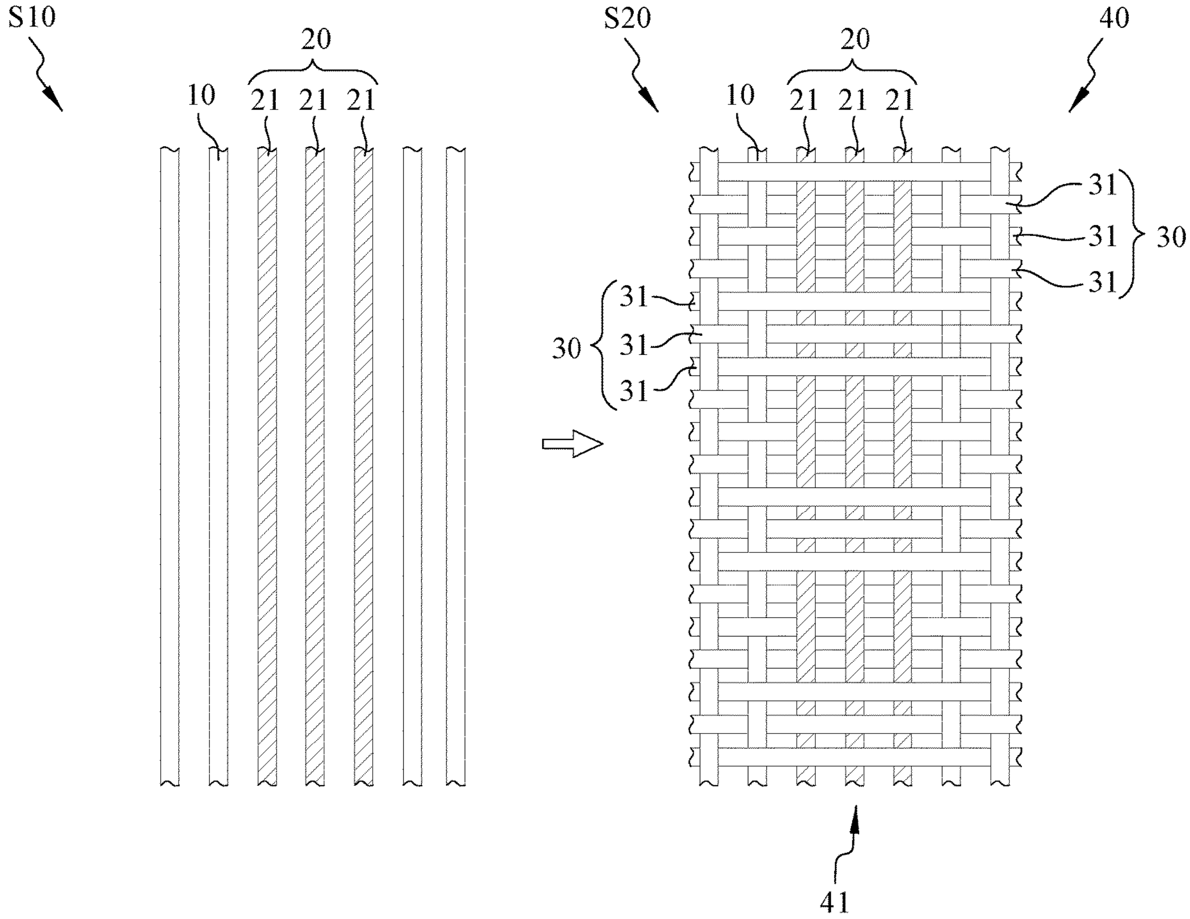
FIG. 2 is a schematic diagram of a step S10 and a step S20 of the manufacturing method of a first embodiment of the present invention.
Figure 3:
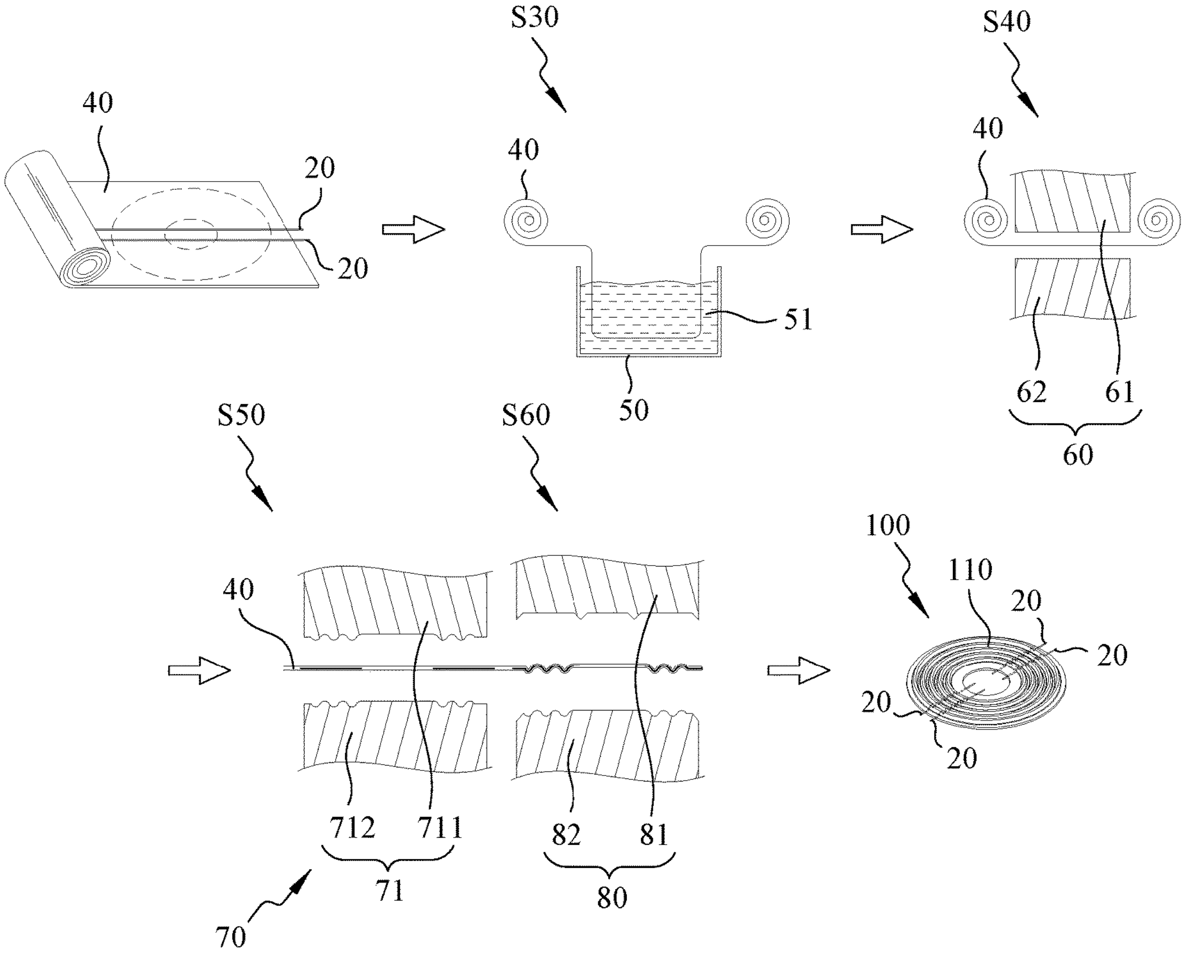
FIG. 3 is a schematic diagram of step S10 to step S50 of the manufacturing method of the first embodiment of the present invention.

FIG. 1 is a flow diagram of a manufacturing method of the present invention. FIG. 2 is a schematic diagram of a step S10 and a step S20 of the manufacturing method of a first embodiment of the present invention. FIG. 3 is a schematic diagram of step S10 to step S50 of the manufacturing method of the first embodiment of the present invention. The present invention provides a method for manufacturing a wire damper of a loudspeaker with periodic span wires, comprising the following steps S10 to S60:

In the step S10, as shown in FIGS. 1 and 2, a plurality of warp yarns 10 and a plurality of wire assemblies 20 are arranged at intervals in a manner that the warp yarns 10 and the wire assemblies 20 extend straightly along a first direction and are parallel to each other. Wherein each wire assembly 20 is composed of a plurality of wires 21, each wire 21 is a monofilament thread, and the wires 21 are arranged at intervals. In other words, the warp yarns 10 and the wires 21 are spaced from each other at a same interval.

In the step S20, as shown in FIGS. 1 and 2, a plurality of weft yarns 31 are interwoven with the warp yarns 10 and the wire assemblies 20 along a second direction to weave a base material 40. Wherein the first direction is perpendicular to the second direction, and three adjacent weft yarns 31 are defined as a weft yarn assembly 30, each wire assembly 20 spans above and below the weft yarn assemblies 30 along the first direction periodically, and an area where the weft yarn assemblies 30 are interwoven with wire assemblies 20 is defined as a wire disposing area 41. To be more specific, the term “periodically spanning” means that each wire assembly 20 continuously and alternately spans the weft yarn assemblies 30. For example, firstly, each wire assembly 20 spans above three weft yarns 31 of one of the weft yarn assemblies 30, and then each wire assembly 20 spans below three weft yarns 31 of another weft yarn assembly 30, and so on.

In the present invention, the plurality of weft yarns 31 is divided into a plurality of weft yarn assemblies 30 with each weft yarn assembly having more than one weft yarn. In some embodiments, the number of the weft yarns 31 in each weft yarn assembly is at least two. For example, every two adjacent weft yarns 31 are defined as a weft yarn assembly 30. Each wire assembly 20 spans above the two weft yarns 31 of one weft yarn assembly 30, and then each wire assembly 20 spans below the two weft yarns 31 of the next weft yarn assembly 30.

In some embodiments, the number of weft yarns 31 of the weft yarn assembly 30 may be different. For example, the number of weft yarns 31 of some weft yarn assembly 30 is two, while in other weft yarn assembly 30, the number of weft yarns 31 is three. More specifically, the first two of five adjacent weft yarns 31 are defined as a first weft yarn assembly, and the remaining three of the five adjacent weft yarns 31 are defined as a second weft yarn assembly. First, each wire assembly 20 spans above the two weft yarns 31 of the first weft yarn assembly 30, and then each wire assembly 20 spans below the three weft yarns 31 of the second weft yarn assembly 30. Next, each wire assembly 20 spans above the two weft yarns 31 of another first weft yarn assembly 30, and then each wire assembly 20 spans below the three weft yarns 31 of another second weft yarn assembly 30, and so on.

In the step S30, as shown in FIGS. 1 and 3, a base material 40 is impregnated in a resin solution 51 in a resin tank 50, such that the warp yarns 10, the wires 21 and the weft yarns 31 adsorb the resin and are adhered with the resin.

In the step S40, as shown in FIGS. 1 and 3, a drying device 60 includes an upper baking plate 61 and a lower baking plate 62. By utilizing the temperature of the upper baking plate 61 and the lower baking plate 62, the moisture and volatile substances in the resin on the base material 40 are removed such that the base material 40 is dried. Meanwhile, the resin penetrates into the base material 40 and is adhered onto the warp yarns 10, the wires 21 and the weft yarns 31, so as to form a solid resin layer 130 (referring to FIG. 5).

In the step S50, as shown in FIGS. 1 and 3, a thermoforming device 70 includes a forming mold 71 and a heating device (not shown), and the forming mold 71 includes an upper mold 711 and a lower mold 712. When the upper mold 711 and the lower mold 712 fit together and pressurize the base material 40, the heating device is applied with electricity to increase the temperature of the upper mold 711 and the lower mold 712 to a range of 190 to 270° C., thereby softening the resin on the base material 40. In addition to destroying the resin structure, the resin also fills up in the gaps, and thus respective parts of the resin are connected with each other to form the final morphology of the solid resin layer 130. Therefore, the resin cover between the warp yarns 10, the wires 21 and the weft yarns 31, thereby forming a wire damper of loudspeaker 100 on the base material 40 by thermoforming. The weft yarns 31 jointly form a first elastic adjustment area 101 between a first side of the wire assemblies 20 and the warp yarn 10 closest to the first side of the wire assemblies 20 (referring to FIG. 5), the weft yarns 31 jointly form a second elastic adjustment area 102 between a second side of the wire assemblies 20 and the warp yarns 10 closest to the second side of the wire assemblies 20 (referring to FIG. 5), a width of the first elastic adjustment area 101 and a width of the second elastic adjustment area 102 are equal to each other, a distance between the warp yarns is smaller than the width of the first elastic adjustment area and the width of the second elastic adjustment area.

In the step S60, as shown in FIGS. 1 and 3, a cutting device 80 includes an upper cutting tool 81 and a lower cutting tool 82, wherein the wire damper of loudspeaker 100 is cut from the base material 40 by the upper cutting tool 81 and the lower cutting tool 82, such that the wire damper of loudspeaker 100 is separated from the base material 40.

Figure 4:
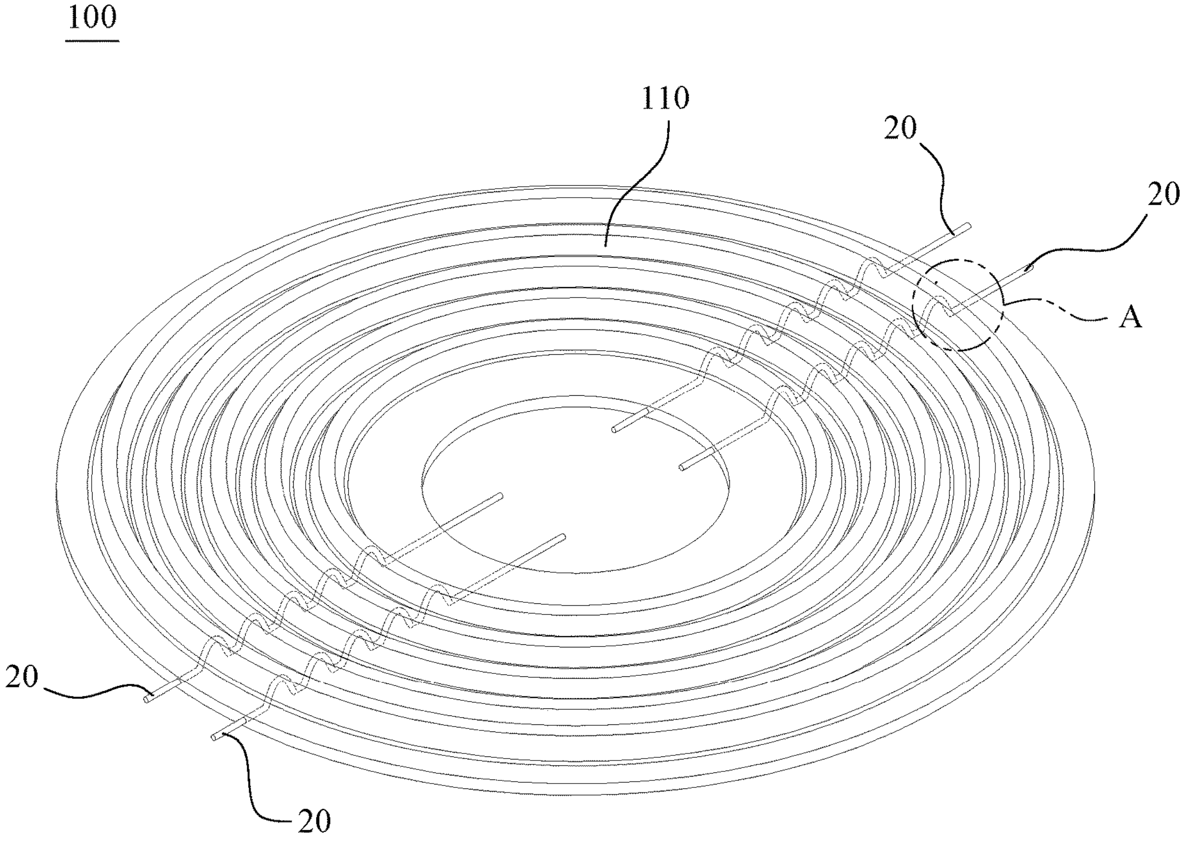
FIG. 4 is a perspective view of a wire damper of a loudspeaker of the first embodiment of the present invention.
Figure 5:
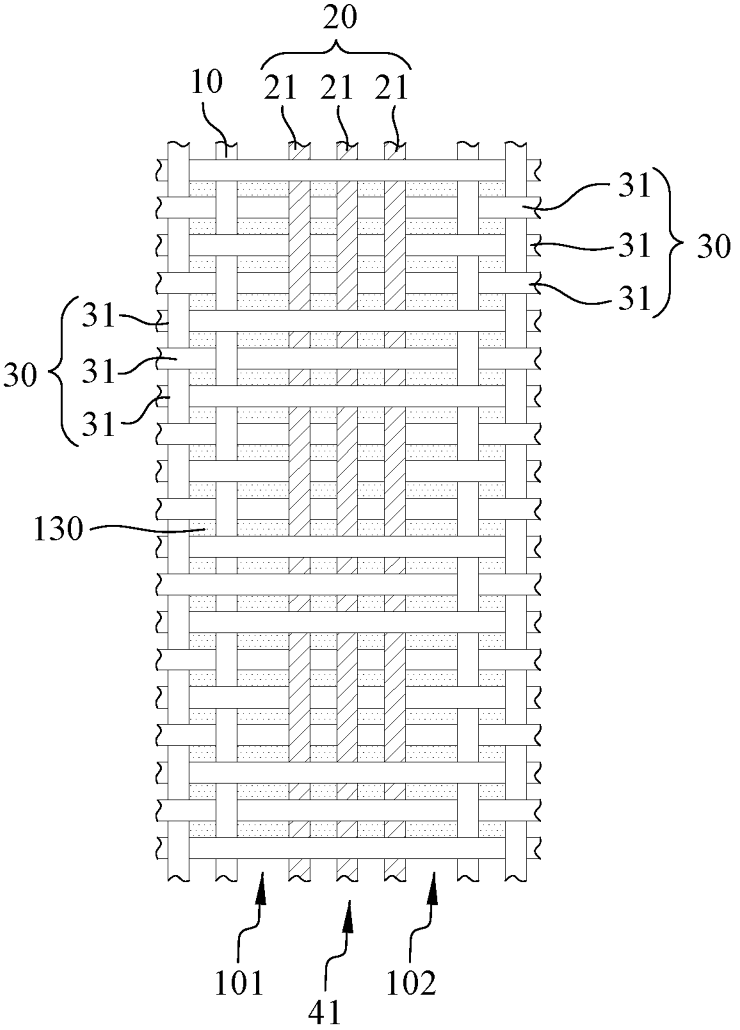
FIG. 5 is a schematic diagram of a region A of FIG. 4.

FIG. 4 is a perspective view of a wire damper of loudspeaker 100 of the first embodiment of the present invention. FIG. 5 is a schematic diagram of a region A of FIG. 4. As shown in FIGS. 4 and 5, the present invention provides a wire damper of loudspeaker 100 with periodic span wires comprises a base material 40, a wire damper of loudspeaker 110, a plurality of wire assemblies 20 and a solid resin layer 130.

The main body 110 includes a plurality of warp yarns 10 and a plurality of weft yarns 31, the warp yarns are arranged at intervals and extend straightly along a first direction and are parallel to each other, the weft yarns 31 are interwoven with the warp yarns 10 along a second direction, the first direction is perpendicular to the second direction, and adjacent three weft yarns 31 are defined as a weft yarn assembly 30.

The wire assemblies 20 are arranged at intervals with the warp yarns 10, extend straightly along the first direction, are parallel to the warp yarns 10, and periodically span above and below the weft yarn assemblies 30 along the first direction. More explicitly, the term "periodical span" refers to continuously and alternately spanning. For example, each wire assembly 20 first spans above three weft yarns 31 of one weft yarn assembly 30, and then spans below three weft yarns 31 of another weft yarn assembly 30, and so on. Wherein each wire assembly 20 is composed of a plurality of wires 21, each wire 21 is a monofilament thread, and the wires 21 are arranged at intervals. Areas where the weft yarn assemblies 30 are interwoven with the wire assemblies 20 are defined as wire disposing areas 41. The weft yarns 31 jointly form a first elastic adjustment area 101 between a first side of the wire assemblies 20 and the warp yarn 10 closest to the first side of the wire assemblies 20, the weft yarns 31 jointly form a second elastic adjustment area 102 between a second side of the wire assemblies 20 and the warp yarns 10 closest to the second side of the wire assemblies 20, a width of the first elastic adjustment area 101 and a width of the second elastic adjustment area 102 are equal to each other, a distance between the warp yarns 10 is smaller than the width of the first elastic adjustment area 101 and the width of the second elastic adjustment area 102.

In some embodiments, the number of the weft yarns 31 in each weft yarn assembly 30 is at least two. For example, two adjacent weft yarns 31 are defined as a weft yarn assembly 30. Each wire assembly 20 spans above the two adjacent weft yarns 31 of one weft yarn assembly 30, and then each wire assembly 20 spans below the two adjacent weft yarns 31 of the next weft yarn assembly 30.

In some embodiments, the number of weft yarns 31 of the weft yarn assembly 30 may be different. For example, the number of weft yarns 31 of some weft yarn assembly 30 is two, while in other weft yarn assembly 30, the number of weft yarns 31 is three. More specifically, the first two of five adjacent weft yarns 31 are defined as a first weft yarn assembly, and the remaining three of the five adjacent weft yarns 31 are defined as a second weft yarn assembly. First, each wire assembly 20 spans above the two adjacent weft yarns 31 of the first weft yarn assembly 30, and then each wire assembly 20 spans below the three adjacent weft yarns 31 of the second weft yarn assembly 30. Next, each wire assembly 20 spans above the two adjacent weft yarns 31 of another first weft yarn assembly 30, and then each wire assembly 20 spans below the three adjacent weft yarns 31 of another second weft yarn assembly 30, and so on. The solid resin layer 130 covers surfaces of the warp yarns 10, the weft yarns 31 and the wires 21.

Figure 6:
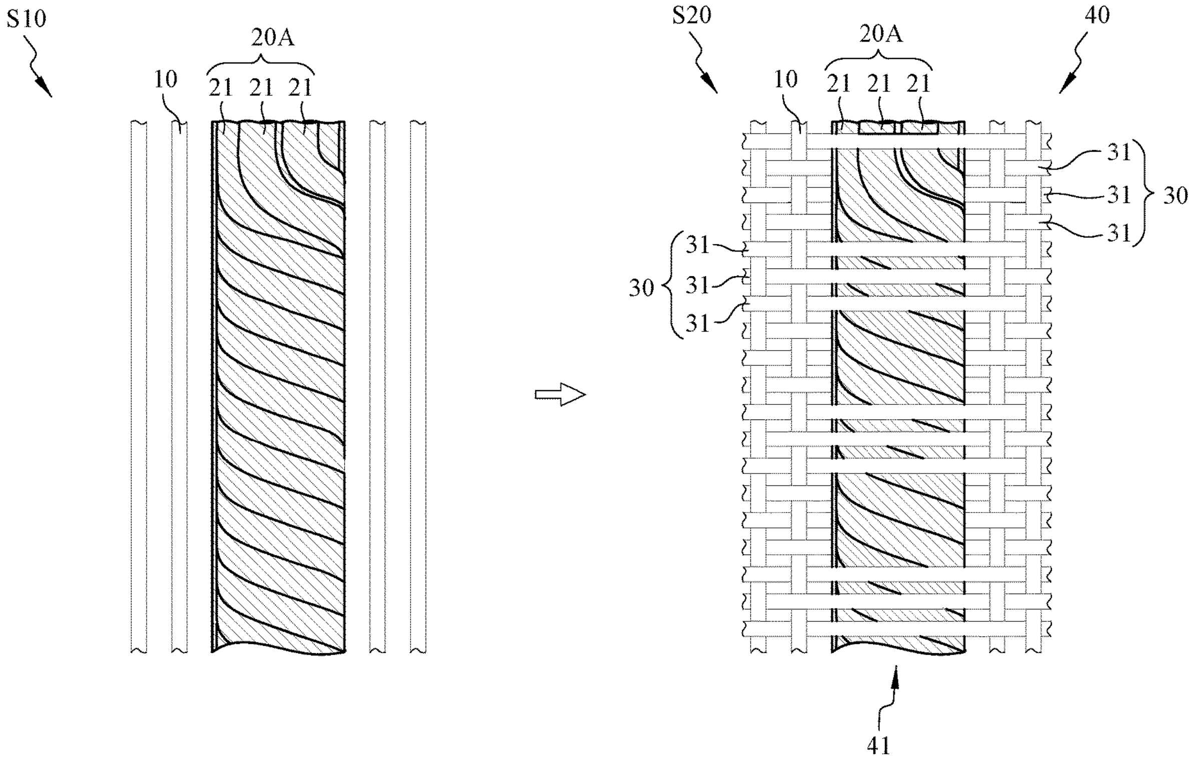
FIG. 6 is a schematic diagram of a step S10 and a step S20 of the manufacturing method of a second embodiment of the present invention.

FIG. 6 is a schematic diagram of a step S10 and a step S20 of the manufacturing method of a second embodiment of the present invention. As shown in FIG. 6, in terms of method, the second embodiment is different from the first embodiment in that in the step S10, the wires 21 are blend-twisted, such that each wire assembly 20A forms a multifilament thread with a circular cross-section.

Figure 7:
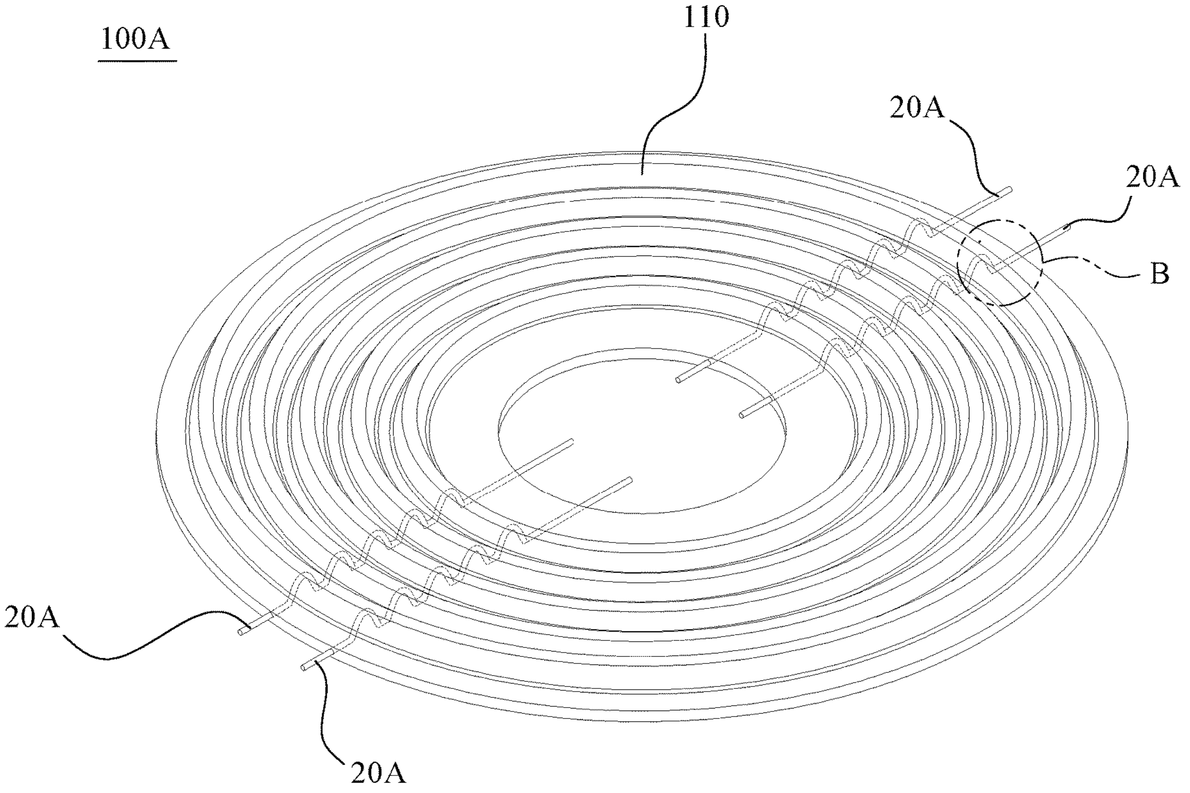
FIG. 7 is a perspective view of a wire damper of a loudspeaker of the second embodiment of the present invention.
Figure 8:
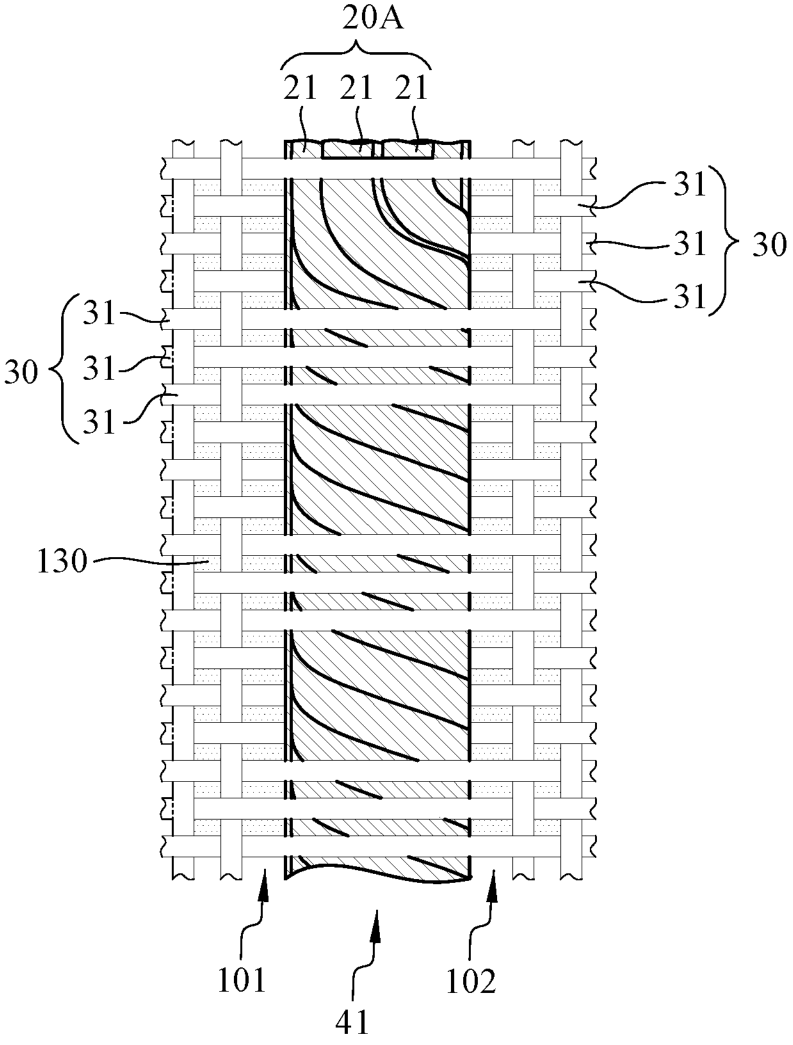
FIG. 8 is a schematic diagram of a region B of FIG. 7.

FIG. 7 is a perspective view of a wire damper of loudspeaker 100A of the second embodiment of the present invention. FIG. 8 is a schematic diagram of a region B of FIG. 7. As shown in FIGS. 7 and 8, in terms of structure, the wires 21 are blend-twisted, such that each wire assembly 20A forms a multifilament thread with a circular cross-section.

Figure 9:
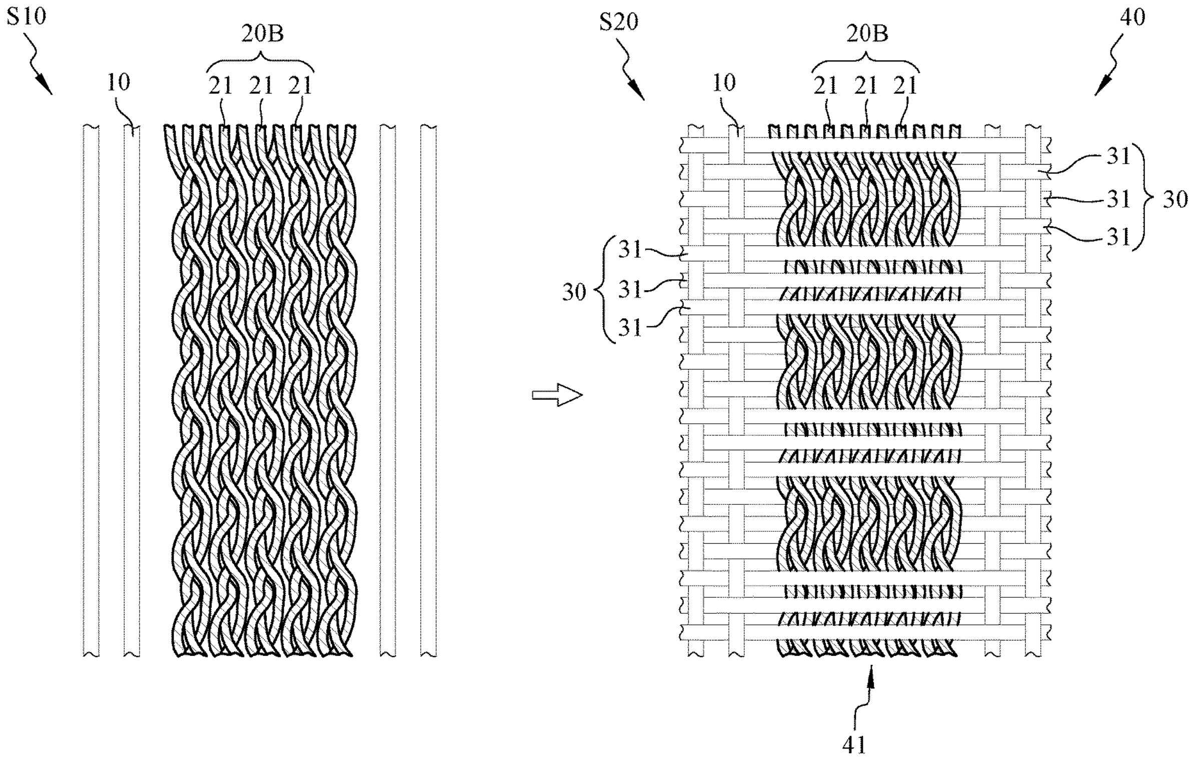
FIG. 9 is a schematic diagram of a step S10 and a step S20 of the manufacturing method of a third embodiment of the present invention.

FIG. 9 is a schematic diagram of a step S10 and a step S20 of the manufacturing method of a third embodiment of the present invention. As shown in FIG. 9, in terms of method, the third embodiment is different from the previous embodiments in that in the step S10, the wires 21 are braided with each other, such that each wire assembly 20B forms a multifilament thread with a flat cross-section.

Figure 10:
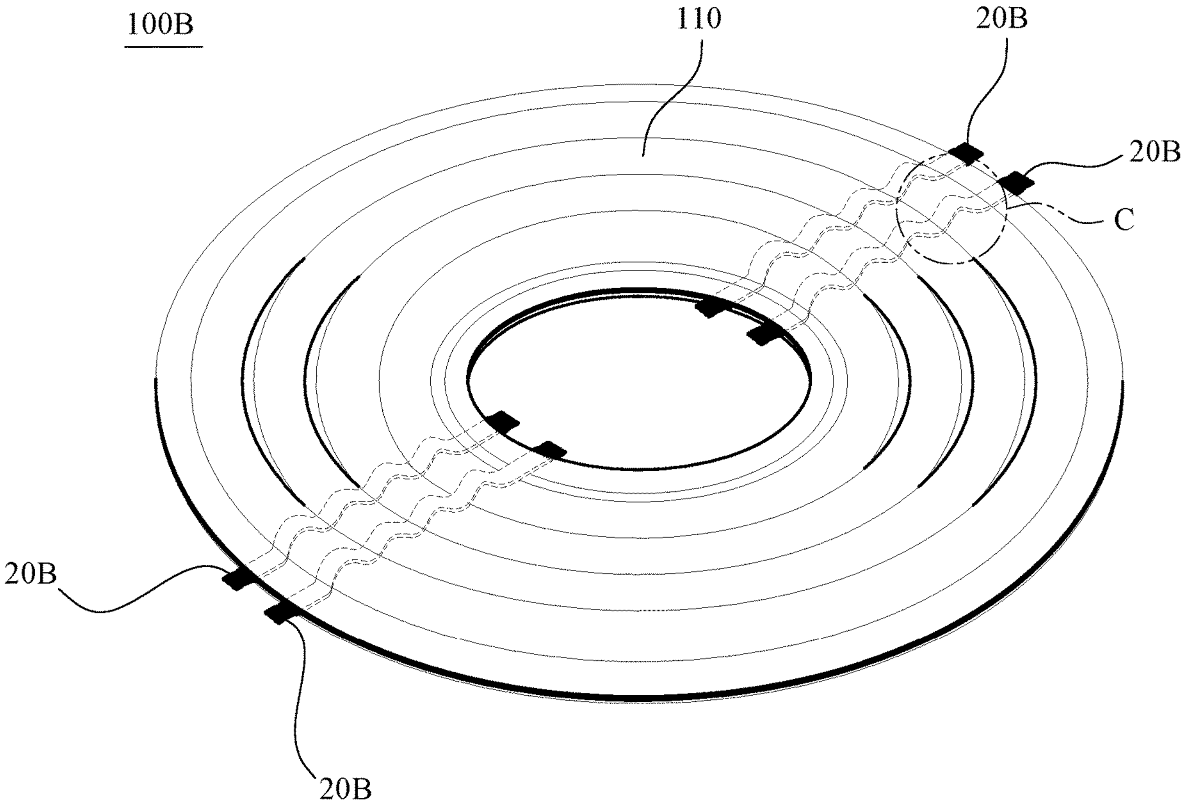
FIG. 10 is a perspective view of a wire damper of loudspeaker of the third embodiment of the present invention.
Figure 11:
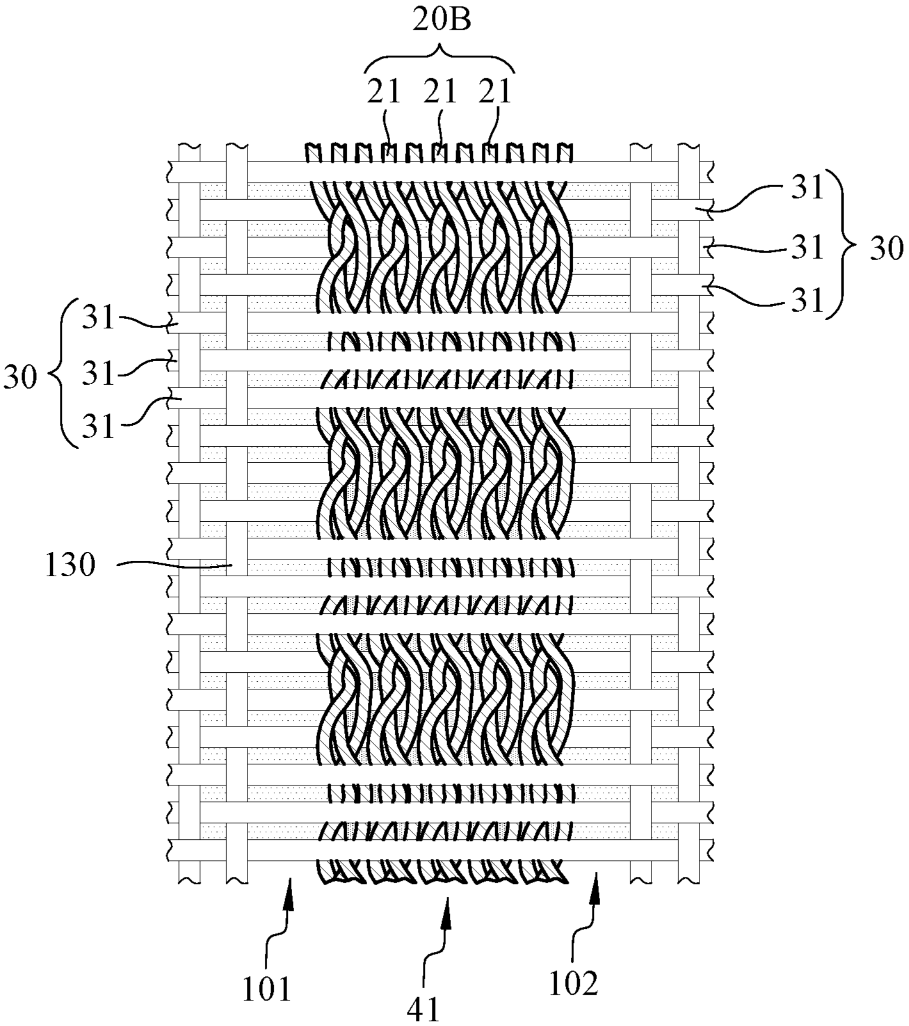
FIG. 11 is a schematic diagram of a region C of FIG. 7.

FIG. 10 is a perspective view of a wire damper of loudspeaker 100B of the third embodiment of the present invention. FIG. 11 is a schematic diagram of a region C of FIG. 10. As shown in FIGS. 10 and 11, in terms of structure, the wires 21 are braided with each other, such that each wire assembly 20B forms a multifilament thread with a flat cross-section.

In summary, in the present invention, by disposing the wire assemblies 20, 20A and 20B in a periodically spanning manner, the strength of the weft yarns 31 fixing the wire assemblies 20, 20A and 20B can be reduced, thereby reducing the influence of the weft yarns 31 on the wire assemblies 20, 20A and 20B, so as to impart the wire assemblies 20, 20A and 20B better elasticity.

It is noted that in the present invention, by disposing the first elastic adjustment area 101 and the second elastic adjustment area 102 in a periodically spanning manner, as well as jointly adjusting the hardness, the elasticity and the toughness of the wire disposing areas 41 by the first elastic adjustment area 101 and the second elastic adjustment area 102, the wire disposing areas 41 become softer, and the elasticity and the toughness of the wire disposing areas 41 are improved, such that the hardness, the elasticity and the toughness of the wire disposing areas 41 and the wire assemblies 20, 20A and 20B are comparable to those of the other areas of the wire dampers of loudspeaker 100, 100A and 100B. Therefore, the wire dampers of loudspeaker 100, 100A and 100B have uniform hardness, elasticity and toughness, thereby having uniform elastic resilience and fatigue resistance, are not easily deformed and brittle, and have improved output sound quality of the loudspeaker.

Those mentioned above are only preferred embodiments for explaining the present invention, but intend to limit the present invention in any forms. Therefore, any modifications or changes related to the present invention made in the same invention spirit should still be included in the scope of the present invention as intended to be claimed.

What is claimed is:

1. A method for manufacturing a wire damper of a loudspeaker with periodic span wires, comprising the following steps:

(a) arranging a plurality of warp yarns and a plurality of wire assemblies at intervals in a manner that the warp yarns and the wire assemblies extend straightly along a first direction and are parallel to each other, wherein each wire assembly is composed of a plurality of wires, and each wire is a monofilament thread;

(b) interweaving a plurality of weft yarns with the warp yarns and the wire assemblies along a second direction to weave a base material, wherein the first direction is perpendicular to the second direction, the plurality of weft yarns is divided into a plurality of weft yarn assemblies with each weft yarn assembly having at least two adjacent weft yarns, each wire assembly periodically spans above the at least two adjacent weft yarns of a first weft yarn assembly and then spans below the at least two adjacent weft yarns of a second weft yarn assembly adjacent to the first weft yarn assembly along the first direction, and an area where the weft yarn assemblies are interwoven with each wire assembly is defined as a wire disposing area;

(c) impregnating the base material in a resin solution;

(d) drying the base material to form a solid resin layer on the base material;

(e) forming a wire damper of a loudspeaker on the base material by thermoforming; and (f) separating the wire damper of the loudspeaker from the base material.

2. The method according to claim 1, wherein in the step (a), the wires are arranged at intervals from each other.

3. The method according to claim 1, wherein in the step (a), the wires are blend-twisted such that each wire assembly forms a multifilament thread with a circular cross-section.

4. The method according to claim 1, wherein in the step (a), the wires are braided with each other such that each wire assembly forms a multifilament thread with a flat cross-section.

5. The method according to claim 1, wherein in the step (e), the weft yarns jointly form a first elastic adjustment area between a first side of each wire assembly and the warp yarn closest to the first side of each wire assembly, the weft yarns jointly form a second elastic adjustment area between a second side of each wire assembly and the warp yarn closest to the second side of each wire assembly, a width of the first elastic adjustment area and a width of the second elastic adjustment area are equal to each other, a distance between the warp yarns is smaller than the width of the first elastic adjustment area and the width of the second elastic adjustment area.

6. The method for manufacturing a wire damper of a loudspeaker with periodic span wires according to claim 1, wherein the first weft yarn assembly consists of two adjacent weft yarns and the second weft yarn assembly consists of two adjacent weft yarns.

7. The method for manufacturing a wire damper of a loudspeaker with periodic span wires according to claim 1, wherein the first weft yarn assembly consists of three adjacent weft yarns and the second weft yarn assembly consists of three adjacent weft yarns.

8. The method for manufacturing a wire damper of a loudspeaker with periodic span wires according to claim 1, wherein the first weft yarn assembly consists of two adjacent weft yarns and the second weft yarn assembly consists of three adjacent weft yarns.

9. A wire damper of a loudspeaker with periodic span wires, comprising:

a main body, which includes a plurality of warp yarns and a plurality of weft yarns, the warp yarns are arranged at intervals and extend straightly along a first direction and are parallel to each other, the weft yarns are interwoven with the warp yarns along a second direction, the first direction is perpendicular to the second direction, and the plurality of weft yarns is divided into a plurality of weft yarn assemblies with each weft yarn assembly having at least two adjacent weft yarns;

a plurality of wire assemblies, which are arranged at intervals with the warp yarns, extend straightly along the first direction, and are parallel to the warp yarns, and wherein each wire assembly periodically spans above the at least two adjacent weft yarns of a first weft yarn assembly and then spans below the at least two adjacent weft yarns of a second weft yarn assembly adjacent to the first weft yarn assembly along the first direction, wherein each wire assembly is composed of a plurality of wires, each wire is a monofilament thread, and an area where the weft yarn assemblies are interwoven with each wire assembly is defined as a wire disposing area; and a solid resin layer, which covers surfaces of the warp yarns, the weft yarns and the wires.

10. The wire damper of the loudspeaker according to claim 9, wherein the wires are arranged at intervals from each other.

11. The wire damper of the loudspeaker according to claim 9, wherein the wires are blend-twisted such that each wire assembly forms a multifilament thread with a circular cross-section.

12. The wire damper of the loudspeaker according to claim 9, wherein the wires are braided with each other such that each wire assembly forms a multifilament thread with a flat cross-section.

13. The wire damper of the loudspeaker according to claim 9, wherein the weft yarns jointly form a first elastic adjustment area between a first side of each wire assembly and the warp yarn closest to the first side of each wire assembly, the weft yarns jointly form a second elastic adjustment area between a second side of each wire assembly and the warp yarn closest to the second side of each wire assembly, a width of the first elastic adjustment area and a width of the second elastic adjustment area are equal to each other, a distance between the warp yarns is smaller than the width of the first elastic adjustment area and the width of the second elastic adjustment area.

14. The wire damper of a loudspeaker with periodic span wires according to claim 9, wherein the first weft yarn assembly consists of two adjacent weft yarns and the second weft yarn assembly consists of two adjacent weft yarns.

15. The wire damper of a loudspeaker with periodic span wires according to claim 9, wherein the first weft yarn assembly consists of three adjacent weft yarns and the second weft yarn assembly consists of three adjacent weft yarns.

16. The wire damper of a loudspeaker with periodic span wires according to claim 9, wherein the first weft yarn assembly consists of two adjacent weft yarns and the second weft yarn assembly consists of three adjacent weft yarns.

* * * * *